US007188309B2

(12) United States Patent
Simmons et al.

(10) Patent No.: US 7,188,309 B2
(45) Date of Patent: Mar. 6, 2007

(54) RESOLVING DOCUMENT OBJECT COLLISIONS

(75) Inventors: Alex J. Simmons, Seattle, WA (US); John D. Griffin, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 310 days.

(21) Appl. No.: 10/186,812

(22) Filed: Jun. 28, 2002

(65) Prior Publication Data
US 2004/0003350 A1 Jan. 1, 2004

(51) Int. Cl.
G06N 3/00 (2006.01)
(52) U.S. Cl. .................................. 715/517
(58) Field of Classification Search ............... 715/764, 715/775, 541, 513, 517, 523, 530; 345/587, 345/676
See application file for complete search history.

(56) References Cited

U.S. PATENT DOCUMENTS

| 2,354,332 | A |   | 7/1944  | Polydoroff ............... 343/788 |
| 5,321,768 | A | * | 6/1994  | Fenrich et al. ............ 382/178 |
| 5,327,342 | A |   | 7/1994  | Roy ........................ 345/467 |
| 5,339,391 | A |   | 8/1994  | Wroblewski et al. ....... 345/607 |
| 5,347,295 | A |   | 9/1994  | Agulnick et al. .......... 345/156 |
| 5,442,742 | A |   | 8/1995  | Greyson et al. ............ 715/539 |
| 5,491,495 | A |   | 2/1996  | Ward et al. ................ 345/173 |
| 5,500,937 | A |   | 3/1996  | Thompson-Rohrlich .... 715/764 |
| 5,517,578 | A |   | 5/1996  | Altman et al. ............. 382/181 |
| 5,559,942 | A |   | 9/1996  | Gough et al. .............. 395/155 |
| 5,583,542 | A |   | 12/1996 | Capps et al. ............... 345/173 |
| 5,590,257 | A |   | 12/1996 | Forcier .................... 715/530 |
| 5,613,019 | A |   | 3/1997  | Altman et al. ............. 382/311 |
| 5,649,133 | A | * | 7/1997  | Arquie .................... 715/764 |
| 5,655,136 | A |   | 8/1997  | Morgan .................... 382/187 |
| 5,760,773 | A |   | 6/1998  | Berman et al. ............. 715/808 |
| 5,768,418 | A |   | 6/1998  | Berman et al. ............. 382/187 |
| 5,809,498 | A |   | 9/1998  | Lopresti et al. ............. 707/6 |
| 5,838,326 | A | * | 11/1998 | Card et al. ................. 715/775 |
| 5,838,819 | A |   | 11/1998 | Ruedisueli et al. ......... 382/187 |
| 5,864,635 | A |   | 1/1999  | Zetts et al. ................ 382/187 |
| 5,867,150 | A | * | 2/1999  | Bricklin et al. ............ 345/173 |
| 5,874,957 | A |   | 2/1999  | Cline et al. ................ 715/786 |
| 5,953,735 | A |   | 9/1999  | Forcier .................... 715/541 |

(Continued)

FOREIGN PATENT DOCUMENTS

DE        40 26 852 A1     2/1991

(Continued)

OTHER PUBLICATIONS

Jakobsen, Thomas, "Advanced Character Physics," 2001, Proceedings, Game Developer's Conference 2001, pp. 1-17.*

(Continued)

Primary Examiner—Stephen Hong
Assistant Examiner—Kyle R. Stork
(74) Attorney, Agent, or Firm—Merchant & Gould

(57) ABSTRACT

Collisions between document objects on a document page are resolved. A collision is identified and a two-dimension resolution of the collision is provided by moving the object the shortest distance from a pre-collision location that would avoid the collision. The process calculates the shortest distance to move the object. The invention also may establish logic that designates some objects as "not able to collide" and the process will not move those objects to resolve a collision.

20 Claims, 14 Drawing Sheets

U.S. PATENT DOCUMENTS

| | | | |
|---|---|---|---|
| 5,963,208 A | 10/1999 | Dolan et al. | 715/760 |
| 5,970,455 A | 10/1999 | Wilcox et al. | 704/270 |
| 6,061,472 A | 5/2000 | Hullender et al. | 382/187 |
| 6,069,626 A | 5/2000 | Cline et al. | 715/786 |
| 6,081,829 A | 6/2000 | Sidana | 709/203 |
| 6,108,445 A | 8/2000 | Uehara | 382/189 |
| 6,128,633 A | 10/2000 | Michelman et al. | 715/525 |
| 6,154,219 A * | 11/2000 | Wiley et al. | 345/587 |
| 6,154,758 A | 11/2000 | Chiang | 715/541 |
| 6,188,405 B1 | 2/2001 | Czerwinski et al. | 715/764 |
| 6,223,145 B1 | 4/2001 | Hearst | 703/22 |
| 6,279,014 B1 | 8/2001 | Schilit et al. | 715/512 |
| 6,295,372 B1 | 9/2001 | Hawkins et al. | 382/187 |
| 6,304,272 B1 * | 10/2001 | Schanel et al. | 345/676 |
| 6,337,698 B1 | 1/2002 | Keely, Jr. et al. | 345/179 |
| 6,340,967 B1 | 1/2002 | Maxted | 345/173 |
| 6,345,389 B1 | 2/2002 | Dureau | 725/116 |
| 6,355,889 B1 | 3/2002 | Butcher et al. | 178/18.03 |
| 6,487,567 B1 | 11/2002 | Michelman et al. | 715/525 |
| 6,487,569 B1 | 11/2002 | Lui et al. | 715/530 |
| 6,529,215 B2 | 3/2003 | Golovchinsky et al. | 715/764 |
| 6,565,611 B1 | 5/2003 | Wilcox et al. | 715/541 |
| 6,594,390 B2 | 7/2003 | Frink et al. | 382/187 |
| 6,651,221 B1 * | 11/2003 | Thompson et al. | 715/541 |
| 6,654,035 B1 | 11/2003 | DeStefano | 345/798 |
| 6,661,409 B2 | 12/2003 | Demartines et al. | 345/179 |
| 6,678,865 B1 | 1/2004 | Pratley et al. | 715/509 |
| 6,690,364 B1 | 2/2004 | Webb | 345/173 |
| 6,741,749 B2 | 5/2004 | Herbert, Jr. | 382/246 |
| 6,801,190 B1 | 10/2004 | Robinson et al. | 345/173 |
| 6,833,827 B2 | 12/2004 | Lui et al. | 345/173 |
| 6,836,759 B1 | 12/2004 | Williamson et al. | 704/235 |
| 6,989,822 B2 | 1/2006 | Pettiross et al. | 345/179 |
| 7,002,560 B2 | 2/2006 | Graham | 345/179 |
| 7,039,234 B2 | 5/2006 | Geidl et al. | 382/187 |
| 7,079,713 B2 | 7/2006 | Simmons | 382/321 |
| 2002/0078035 A1 * | 6/2002 | Frank et al. | 707/3 |
| 2002/0097270 A1 | 7/2002 | Keely et al. | 345/764 |
| 2002/0126153 A1 | 9/2002 | Withers et al. | 715/773 |
| 2003/0214491 A1 | 11/2003 | Kelly et al. | 345/179 |
| 2003/0214531 A1 | 11/2003 | Chambers | 345/764 |
| 2003/0215142 A1 | 11/2003 | Gounares et al. | 382/190 |
| 2004/0003350 A1 | 1/2004 | Simmons et al. | 715/517 |

FOREIGN PATENT DOCUMENTS

JP    3-270403    12/1991

OTHER PUBLICATIONS

Wilcox et al., "Dynomite: A Dynamically Organized Ink and Audio Notebook," Computer-Human Interaction, Mar. 27, 1997, pp. 186-193.

G. Fitzmaurice et al., "Tracking Menus," CHI 2003, vol. 5, No. 2, pp. 71-80, 2003.

Copending U.S. Appl. No. 10/186,865, filed Jun. 28, 2002 entitled "System and Method for Automatically Recognizing Electronic Handwriting in an Electronic Document and Converting to Text".

Copending U.S. Appl. No. 10/186,837, filed Jun. 28, 2002 entitled "Space Management for Electronic Documents".

Copending U.S. Appl. No. 10/186,847, filed Jun. 28, 2002 entitled "Method and System for Editing Electronic Ink".

Copending U.S. Appl. No. 10/780,366, filed Feb. 17, 2004 entitled "Writing Guide for a Free-Form Document Editor".

Copending U.S. Appl. No. 10/782,133, filed Feb. 18, 2004 entitled "Glom Widget".

Copending U.S. Appl. No. 10/782,132, filed Feb. 18, 2004 entitled "Tapping to Create Writing".

* cited by examiner

RESOLVING DOCUMENT OBJECT COLLISIONS

RELATED PATENT APPLICATIONS

This patent application is also related to the following non-provisional patent applications: U.S. patent application Ser. No. 10/186,388, entitled "Writing Guide for a Free-Form Document Editor"; U.S. patent application Ser. No. 10/186,847, entitled "Method and System for Editing Electronic Ink"; U.S. patent application Ser. No. 10/186,874, entitled "Method and System for Selecting Objects on a Display Device"; U.S. patent application Ser. No. 10/186,837, entitled "Space Management for Electronic Documents"; U.S. patent application Ser. No. 10/186,865, entitled "System and Method for Automatically Recognizing Electronic Handwriting in an Electronic Document and Converting to Text"; U.S. patent application Ser. No. 10/186,820, entitled "Method and System for Categorizing Data Objects with Designation Tools"; U.S. patent application Ser. No. 10/186,463, entitled "Method and System for Displaying and Linking Ink Objects with Recognized Text and Objects". These applications and the application herein are all being filed on the same date, Jun. 28, 2002, and are assigned to the Microsoft Corporation. The subject matter of each of these applications is hereby frilly incorporated by reference.

FIELD OF THE INVENTION

The present invention relates to editing electronic documents and more specifically relates to a method for resolving document object collisions resulting from document editing.

BACKGROUND OF THE INVENTION

Electronic document editors are widely used in homes and businesses today. Familiar examples of these editors include word processing applications that operate on personal computers (PCs) and note-taking applications that operate on personal data assistants (PDAs). These applications strive to replace paper as the simplest means to record and communicate information. However, to replace and enhance paper's utility, the electronic document editor must allow the user to place document objects on a page and to edit, move, resize, and add objects, while ensuring that the user can clearly view the individual objects.

Note-taking using a free-form document editor can be enhanced by using certain hardware devices. For example, an electronic tablet can be used to record handwriting and input the handwriting to a conventional computer. Such electronic tablets typically comprise a screen and a handheld device that is similar to a pen (also referred to as a stylus). A user can use the pen to write on the electronic tablet in a manner similar to using traditional pen and paper. The electronic tablet can "read" the strokes of the user's handwriting with the handheld device and render the handwriting in electronic form on the tablet's screen or the computer's display as "electronic ink." Additionally, the user can create a drawing or text onto blank areas on the page using the stylus and electronic tablet or using a keyboard, pointing device, or other input device. These areas of text or images are called document objects.

Some document constraints can reduce a user's ability to take notes efficiently and effectively using a conventional document editor. A free-form document editor operates to eliminate some document constraints by enabling free-form note taking. Accordingly, the free-form document editor has a different document behavior than a word processor document editor.

By eliminating some document constraints, a free-form document editor may trigger a need for object management in free-form document editors. By adding new objects to a page, or editing, moving, or resizing existing objects, one object may collide with another object on the screen. This collision could either cause one object to cover another, obscuring information in that covered object, or, as traditional electronic document editors do, merely bump the lower object vertically down the page (a one-dimensional solution). Neither of these approaches would allow the free-form document editor to maximize its two-dimensional character. Additionally, in some cases, a user may want the objects to overlap. As such, the system uses a method that resolves collisions two-dimensionally while allowing user flexibility.

SUMMARY OF THE INVENTION

Collisions between document objects on a document page are resolved. A collision is identified and a two-dimension resolution of the collision is provided by moving the object the shortest distance from a pre-collision location that would resolve the collision. The method calculates the shortest distance to move the object. The invention also may establish logic that designates some objects as "not able to collide" and the method will not move those objects to resolve a collision.

In one aspect of an exemplary embodiment of the invention, an existing page in an electronic document is modified. By adding a new document object or editing, resizing, or moving an existing object, the boundary of one document object intersects with the boundary of another document object. When the collision occurs, the method determines the shortest distance required to move the object to resolve the collision, either straight down or straight to the right or left, and moves the object in the direction of the shortest distance. If, by moving the second object, another collision occurs, the program resolves the new collision in the same manner.

In a second aspect of an exemplary embodiment of the invention, an existing page in an electronic document is modified. By adding a new object or editing, resizing, or moving an existing object, the boundary of one object intersects with the boundary of another object that the user does not want to move. When the collision occurs, the program does not move the second object. Instead, the objects overlap until the user reconfigures the objects such that the object is then able to move.

The aspects of the present invention may be more clearly understood and appreciated from a review of the following detailed description of the disclosed embodiments and by reference to the drawings and claims.

DETAILED DESCRIPTION OF THE EXEMPLARY EMBODIMENTS

Exemplary embodiments of the present invention provide a method for maintaining the layout of a free-form electronic document, by moving objects after collisions so that the user can clearly see the individual objects while working with the electronic document.

Figure 1:
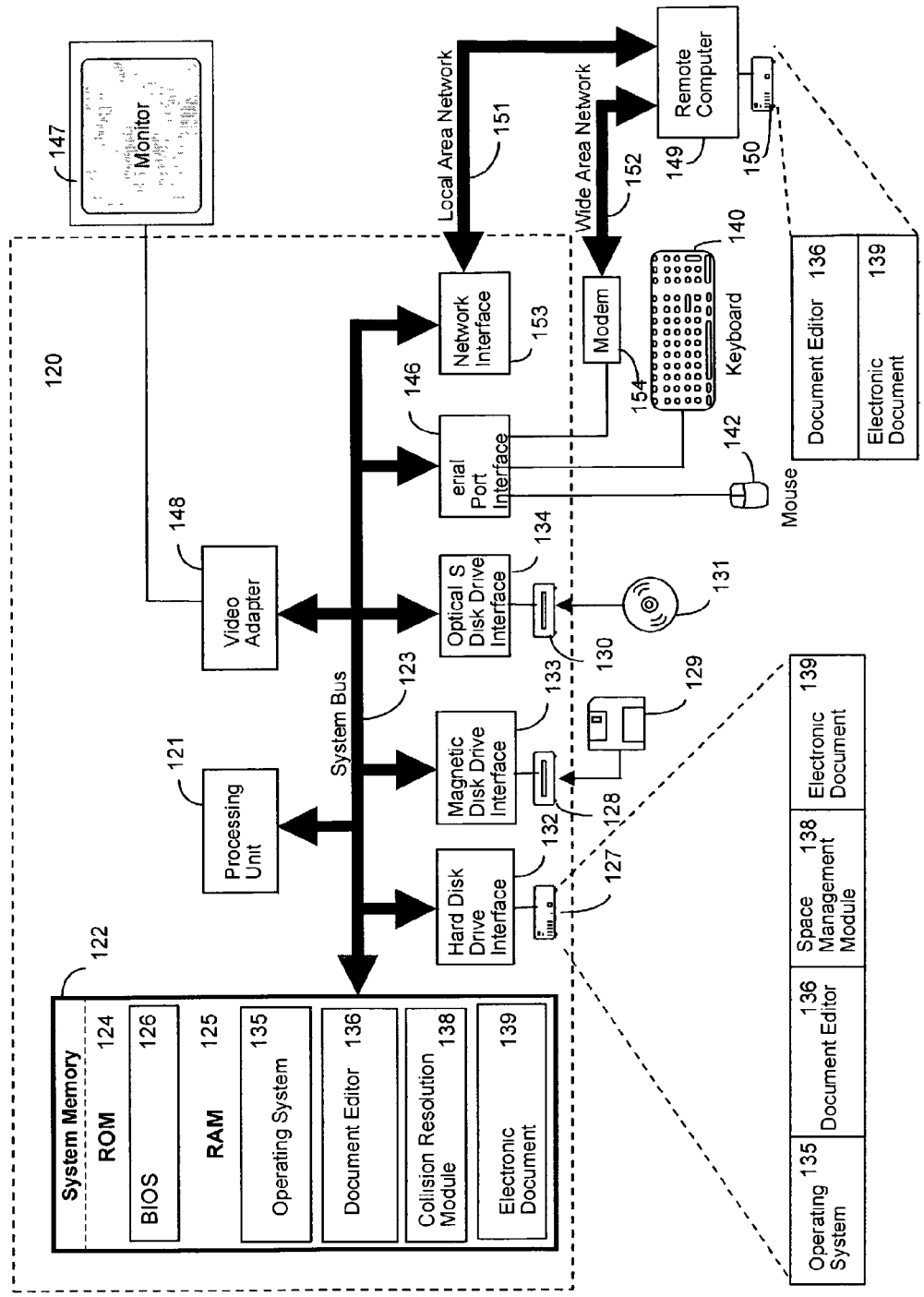
FIG. 1 is a block diagram illustrating an exemplary operating environment for implementating embodiments of the present invention.

FIG. 1 illustrates an exemplary operating environment for implementating the present invention. The exemplary operating environment includes a general-purpose computing device in the form of a conventional personal computer 120. Generally, the personal computer 120 includes a processing unit 121, a system memory 122, and a system bus 123 that couples system components including the system memory 122 to the processing unit 121. The system bus 123 may be any of several types of bus structures including a memory bus or memory controller, a peripheral bus, and a local bus using any bus architecture. The system memory includes a read-only memory (ROM) 124 and a random access memory (RAM) 125. A basic input/output system (BIOS) 126, containing the basic routines that help to transfer information between elements within personal computer 120, such as during start-up, is stored in ROM 124.

Personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD-ROM or other optical media. Hard disk drive 127, magnetic disk drive 128, and optical disk drive 130 are connected to system bus 123 by a hard disk drive interface 132, a magnetic disk drive interface 133, and an optical disk drive interface 134, respectively. Although the exemplary environment described herein employs hard disk 127, removable magnetic disk 129, and removable optical disk 131, it should be appreciated by those skilled in the art that other types of computer readable media that can store data that is accessible by a computer, such as magnetic cassettes, flash memory cards, digital video disks, Bernoulli cartridges, RAMs, ROMs, and the like, may also be used in the exemplary operating environment. The drives and their associated computer-readable media provide nonvolatile storage of computer-executable instructions, data structures, program modules, and other data for personal computer 120.

A number of program modules may be stored on hard disk 127, magnetic disk 129, optical disk 131, ROM 124, or RAM 125, including an operating system 135, a document editor 136, a collision resolution module 138, and an electronic document 139. Program modules include routines, sub-routines, programs, objects, components, data structures, etc., that perform particular tasks or implement particular abstract data types. Aspects of the present invention may be implemented in the form of a document editor 136 that can operate in concert with the collision resolution module 138 to edit the electronic document 139. The document editor 136 generally comprises computer-executable instructions for creating and editing electronic documents. The collision resolution module 138 is generally accessible to the document editor 136, but also can be implemented as an integral part of the document editor.

A user may enter commands and information into personal computer 120 through input devices, such as a keyboard 140 and a pointing device 142. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 122 through a serial port interface 146 that is coupled to the system bus 123, but may be connected by other interfaces, such as a parallel port, game port, a universal serial bus (USB), or the like. A display device 147 may also be connected to system bus 123 via an interface, such as a video adapter 148. In addition to the monitor, personal computers typically include other peripheral output devices (not shown), such as speakers and printers.

The personal computer 120 may operate in a networked environment using logical connections to one or more remote computers 149. Remote computer 149 may be another personal computer, a server, a client, a router, a network PC, a peer device, or other common network node. While a remote computer 149 typically includes many or all of the elements described above relative to the personal computer 120, only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is often connected to the local area network 151 through a network interface or adapter 153. When used in a WAN networking environment, the personal computer 120 typically includes a modem 154 or other means for establishing communications over WAN 152, such as the Internet. Modem 154, which may be internal or external, is connected to system bus 123 via serial port interface 146. In a networked environment, program modules depicted relative to personal computer 120, or portions thereof, may be stored in the remote memory storage device 150. It will be appreciated that the network connections shown are exemplary and other means of establishing a communications link between the computers may be used.

Moreover, those skilled in the art will appreciate that the present invention may be implemented in other computer system configurations, including hand-held devices (PDAs), multiprocessor systems, microprocessor based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
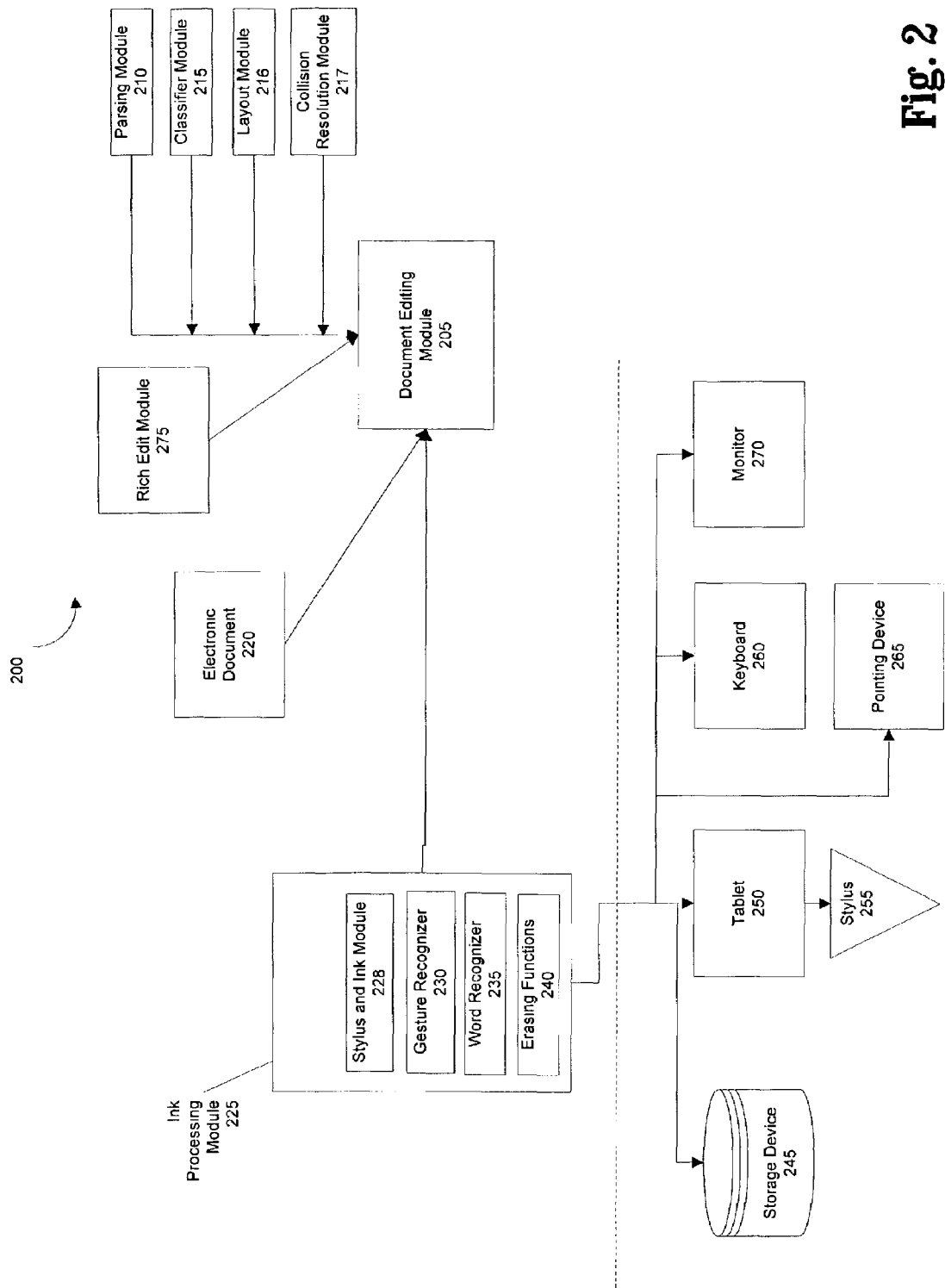
FIG. 2 is a block diagram depicting the primary functional components of an exemplary free-form document editor and related input devices.

FIG. 2 is a block diagram depicting the primary functional components of an exemplary free-form document editor and related input devices. Specifically, FIG. 2 depicts typical hardware and software components used in operating an exemplary embodiment of the invention in the context of a free-form document editor. Conventional input devices are represented by the keyboard 260 and the pointing device 265 (e.g., mouse, pen and tablet). A user can enter commands and information into the computer 20 using the pointer device or another input devices. Other input devices (not shown) may include a microphone, joystick, game pad, satellite dish, and scanner. A conventional output device, such as monitor 270, is used to display information from the computer 20. Other output devices (not shown) can include a printer or speaker. Other hardware components shown in FIG. 2 include an electronic tablet 250 and an accompanying stylus 255. The tablet 250 and stylus 255 are used to input handwriting strokes that can be converted to data, referred to as electronic ink. The electronic ink may be incorporated into an electronic document 220 and may be displayed on either the electronic tablet 250, the monitor 270, or both. Although the electronic tablet 250 and the monitor 270 are illustrated as being distinct, in an exemplary embodiment of the present invention, they can be integrated into a single component. The joint tablet/monitor component has the ability to display information and receive input from the stylus 255.

In the representative architecture 200 all of the hardware components are coupled to an ink processing software module 225. The ink-processing module 225 is operable to receive data from the electronic tablet 250 and to render that data as electronic ink. In one embodiment of the present invention, the ink-processing module 225 can be a collection of software modules that perform different tasks for rendering handwriting strokes as electronic ink. For example, the stylus and ink module 228 can receive data describing the positions and angles of the stylus for a series of handwriting strokes. The stylus and ink module 228 can interpret the data for rendering electronic ink. Other software modules, such as a gesture recognizer 230 and word recognizer 235 can be designed to identify certain handwriting strokes and assign them a particular significance. For example, certain gestures such as a cross-out may be recognized and associated with other editing processes. The ink-processing module 225 can also include an erasing functions module 240 for removing electronic ink that has been previously rendered.

Although ink processing modules are known in the art and necessary for an electronic tablet to function, a novel document editing module has been developed by the Microsoft Corporation of Redmond, Wash. that capitalizes on the benefits of handwriting processing technology. The module (i.e., document editor) is a free-form document editor that leverages the functionality of electronic handwriting technology to enable more effective and efficient note taking. Specifically, document editing module 205 facilitates manipulating electronic ink so that a user can create and modify an electronic document 220 with greater ease and sophistication. The document editing module 205 typically comprises a collection of software modules for controlling and manipulating electronic ink rendered on the monitor 270. For example, a parsing module 210 can be used to identify handwriting strokes that are selected by the user for editing. Selected strokes may by highlighted or shaded to assist the user in identifying which strokes are to be edited. A classifier module 215 can identify certain handwriting strokes as being part of a word or drawing and may designate document objects accordingly. Software modules such as the layout module 216 and the collision resolution module 217 can be designed to control how objects move about a page.

Exemplary embodiments of the present invention relate most directly to managing the layout in an electronic document by resolving object collisions. The functionality of embodiments may be performed by a collision resolution module 217 or may be fully integrated into the operation of the document editing module 205. FIGS. 1 and 2 provide a general overview of the environments in which the inventors contemplate exemplary embodiments of the present invention will be used.

Figure 3:
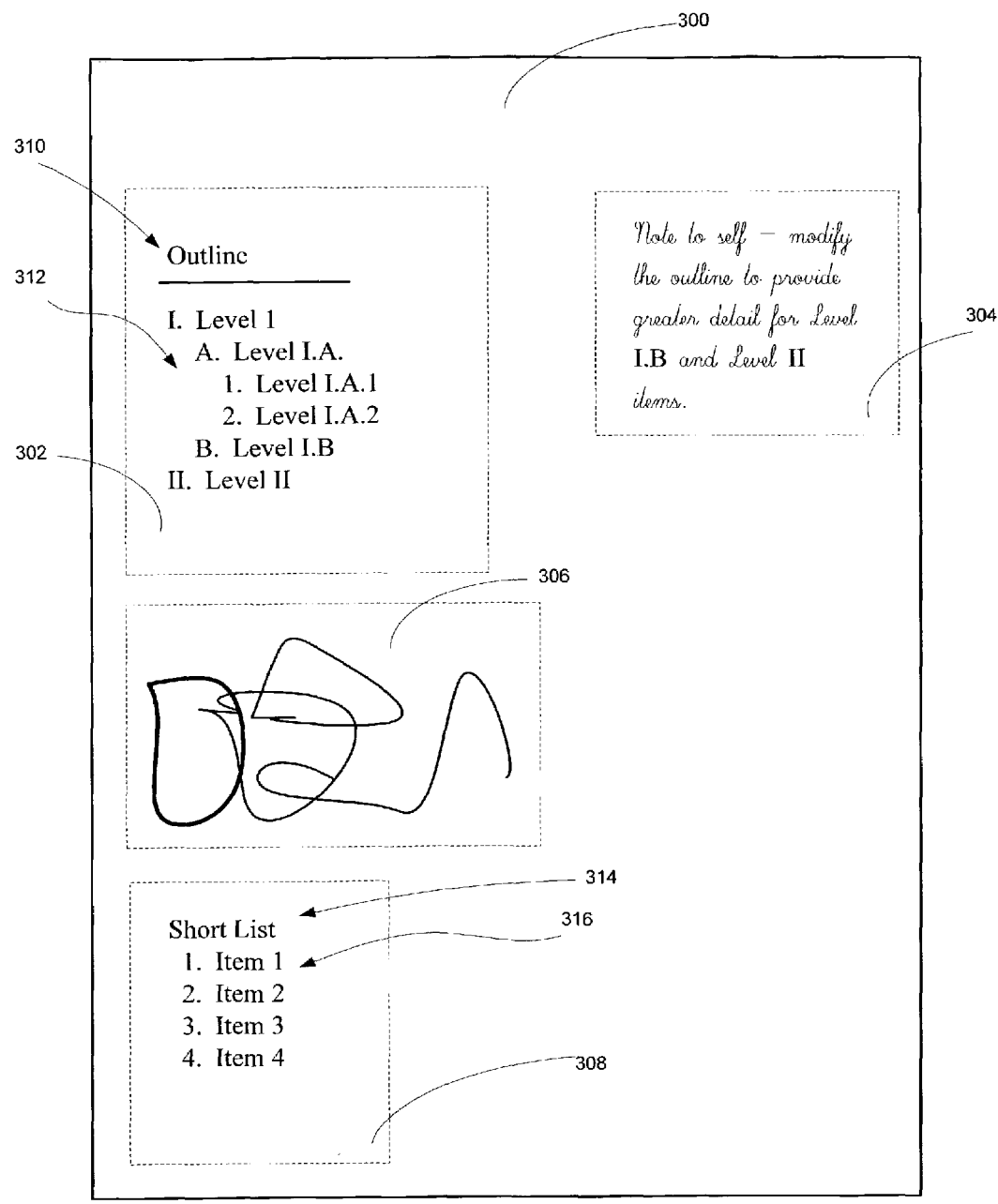
FIG. 3 is a block diagram depicting an exemplary electronic document screen containing document objects.

FIG. 3 presents an exemplary embodiment of a free-form electronic document screen 300 with document objects. A document object 302 is an outline object and includes an outline heading 310 and outline text 312. Below the outline object is a drawing object 306 and beneath that object is a text object 308 containing a heading 314 and a list of items 316. To the right of the outline object 302 is a handwriting object 304. The handwriting object 304 illustrates an object that may have been added to the document using a stylus and electronic tablet. Each of these four objects can be moved about the page, resized, or edited, or a new object may be added to the page. FIG. 3 depicts document objects with rectangular boundaries. One skilled in the art would appreciate that object boundaries may also be defined as coextensive with the object contents.

Figure 4:
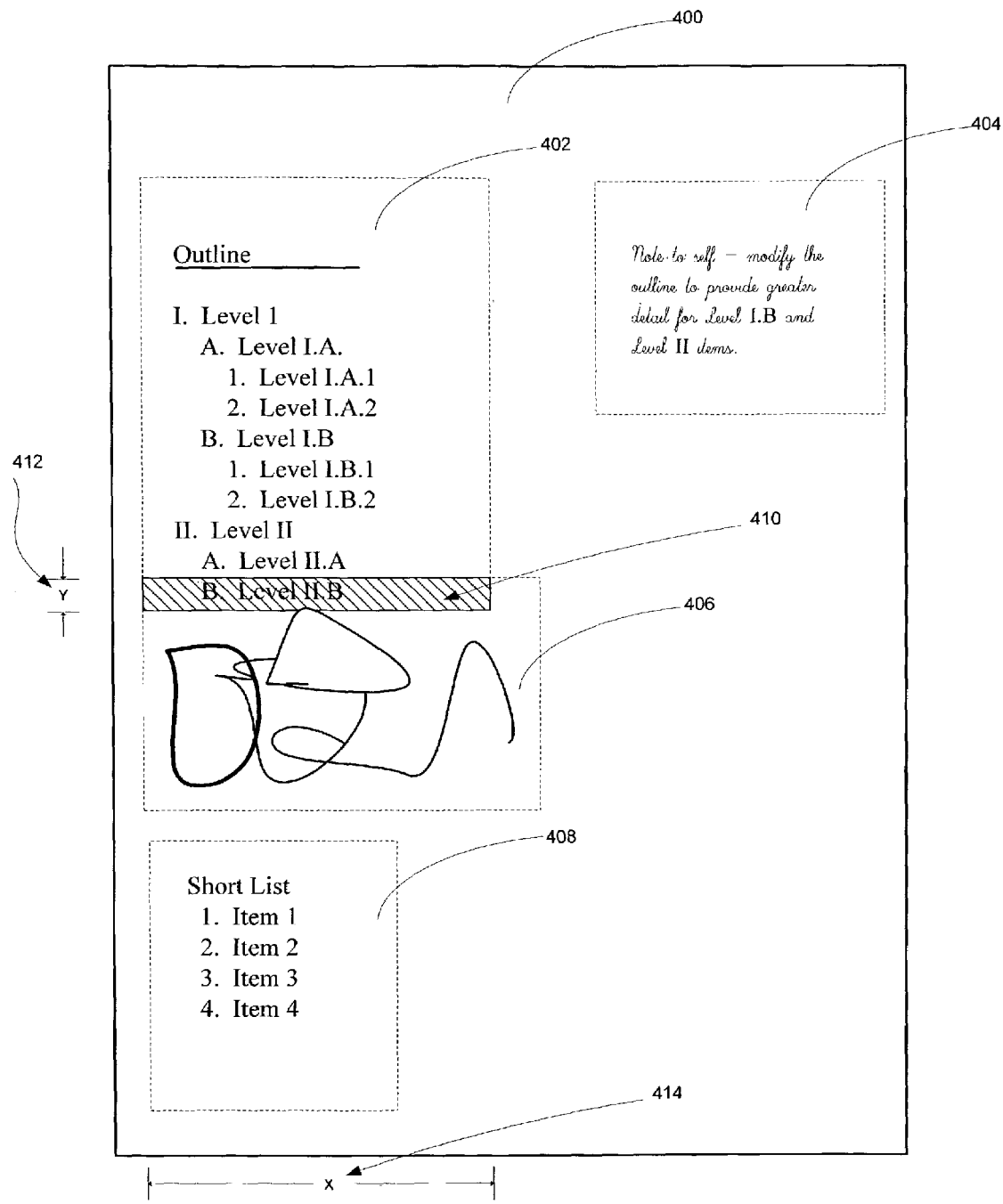
FIG. 4 is a block diagram depicting an exemplary screen containing document objects and illustrating a collision.

FIG. 4 presents an exemplary free-form electronic document screen 400 with an outline object 402, a handwriting object 404, a drawing object 406, and a text object 408. This screen is similar to the screen depicted in FIG. 3. However, FIG. 4 shows that the outline object 402 has been modified; text has been added to the outline object, for example, by using a keyboard. When text was added to the outline, the outline object 402 grew and overlapped the drawing object 406. This overlap is depicted by the cross-hatched region 410. This overlap is the result of a document collision. One skilled in the art would appreciate that collision rules other than overlapping can be used, e.g., when one object comes within a small distance of another.

In an exemplary embodiment of the present invention a determination is made every time a document page is modified as to whether a document object collision has occurred. Modifications include editing an object (illustrated in FIG. 4), resizing an object, moving an object, or adding an object. If a document object collision is determined, then the resolution process is triggered.

The cross-hatched region 410 representing a document object overlap in FIG. 4 has a width "X" 414 and a height "Y" 412. In an exemplary embodiment of the present invention the shortest distance needed to move the drawing object 406 to resolve the collision is determined. In an embodiment of the present invention, the collision is resolved in real time and the object hit by the edited, moved, resized, or added object is moved the shortest distance. In the collision illustrated in FIG. 4, the height 412 of the collision region 410 is less than the width 414 of the region, so the shortest distance the drawing object 406 can move to resolve the collision is the distance represented by Y. Accordingly, in an exemplary embodiment of the present invention, the object is moved straight down. The example in FIG. 4 depicts a collision between objects whose boundaries are represented by rectangular boxes. One skilled in the art would realize that in another embodiment, an object's boundaries could be defined by the boundaries of the object content. In that case, a collision rule could define a collision as when content of one object overlaps content of another object.

Figure 5:
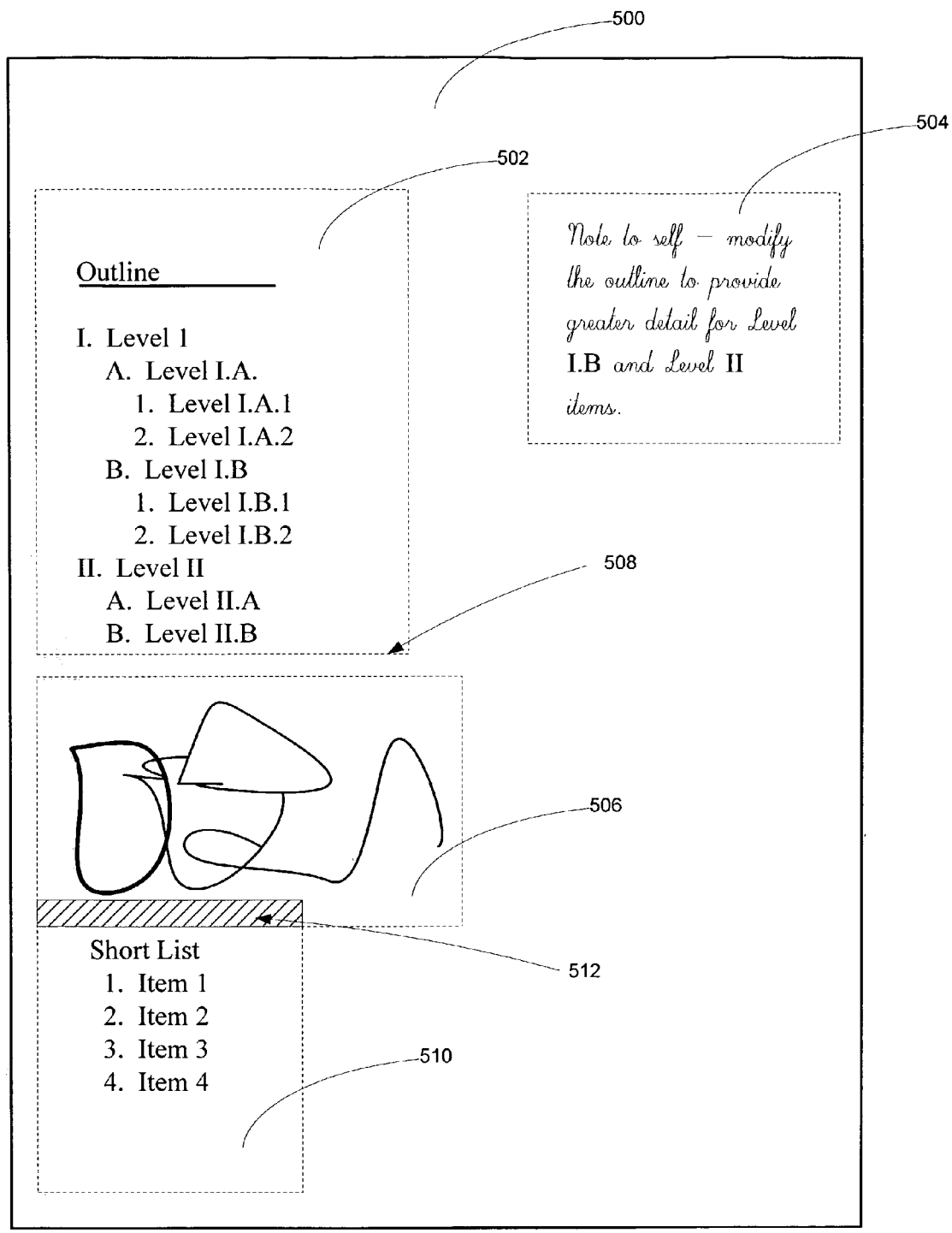
FIG. 5 is a block diagram depicting an exemplary screen containing document objects and illustrating resolving a collision with associated secondary collision.

FIG. 5 depicts an exemplary free-form document screen 500 as it may look after the collision illustrated in FIG. 4 is resolved by an exemplary embodiment of the present invention. The outline object 502, which collided with a drawing object 506 when text was added to the outline object 502, may remain in the same position as when the collision occurs. The drawing object 506 moves straight down the page from its pre-collision location on the page, depicted by the gray shaded box 508, to its new location, depicted by the dash-lined box 506. When the initial collision depicted in FIG. 4 is resolved in this example, the resulting movement caused a secondary collision between the drawing object 506 and the text object 510. The collision is illustrated by the overlap region 512, shown cross-hatched in FIG. 5. An exemplary embodiment of the present invention, after resolving the initial collision, will determine if the resolution resulted in additional collisions. If additional collisions are identified, the additional collisions are resolved. This process of determining and resolving collisions ends when no more collisions exist.

Figure 6:
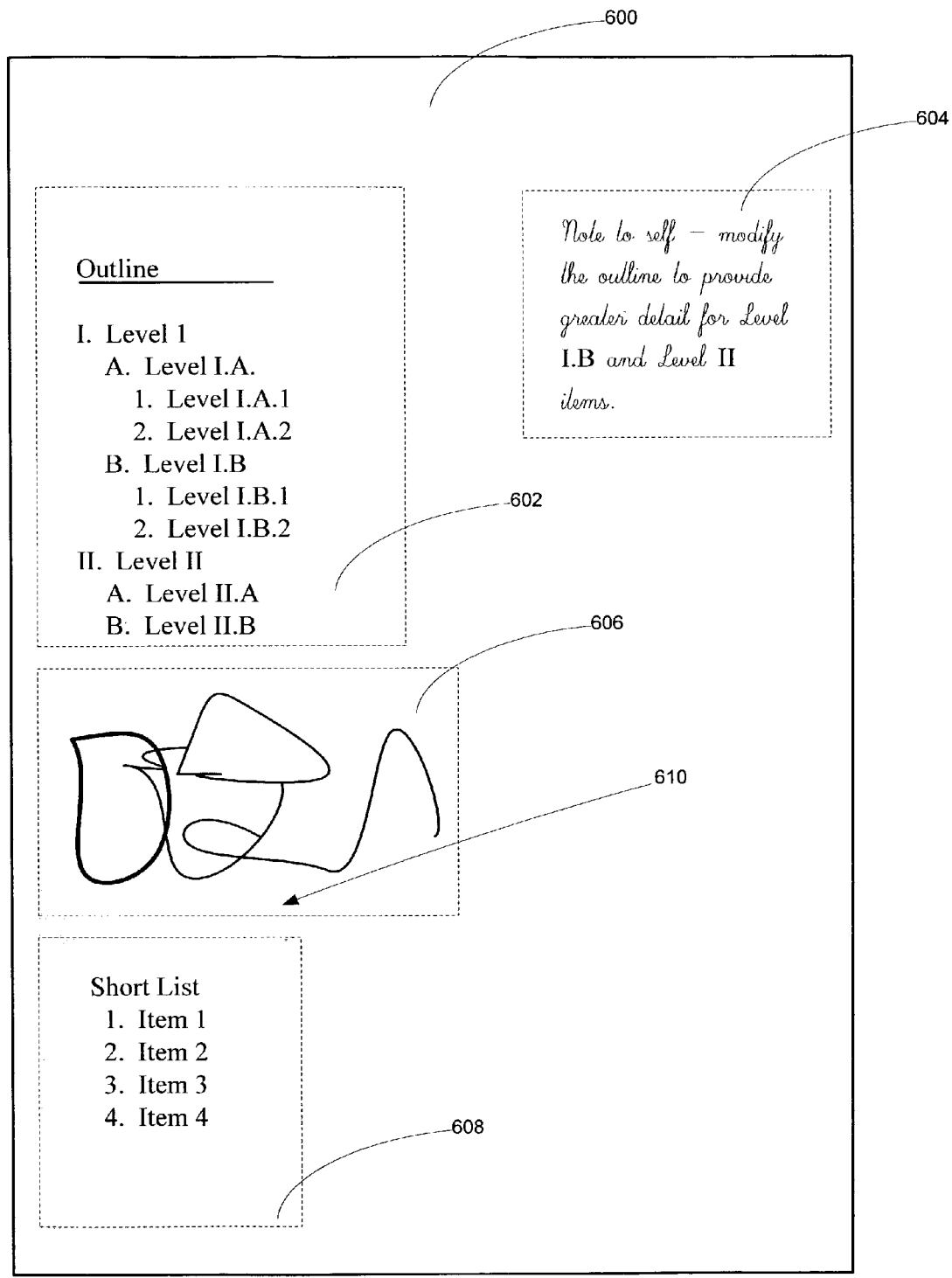
FIG. 6 is a block diagram depicting an exemplary screen containing document objects and illustrating resolving the secondary collision.

FIG. 6 depicts an exemplary free-form document screen 600 as it may look after the secondary collision illustrated in FIG. 5 is resolved by an exemplary embodiment of the present invention. The drawing object 606, which collided with a text object 608 after the initial collision is resolved, may remain in the same position as when the secondary collision occurs. The text object 608 may be moved straight down the page from a pre-collision location on the page, depicted by the gray shaded box 610, to a new location, depicted by the dash-lined box 608. The outline object 602 and the handwriting object 604 may not be affected by the collision resolution.

Figure 7:
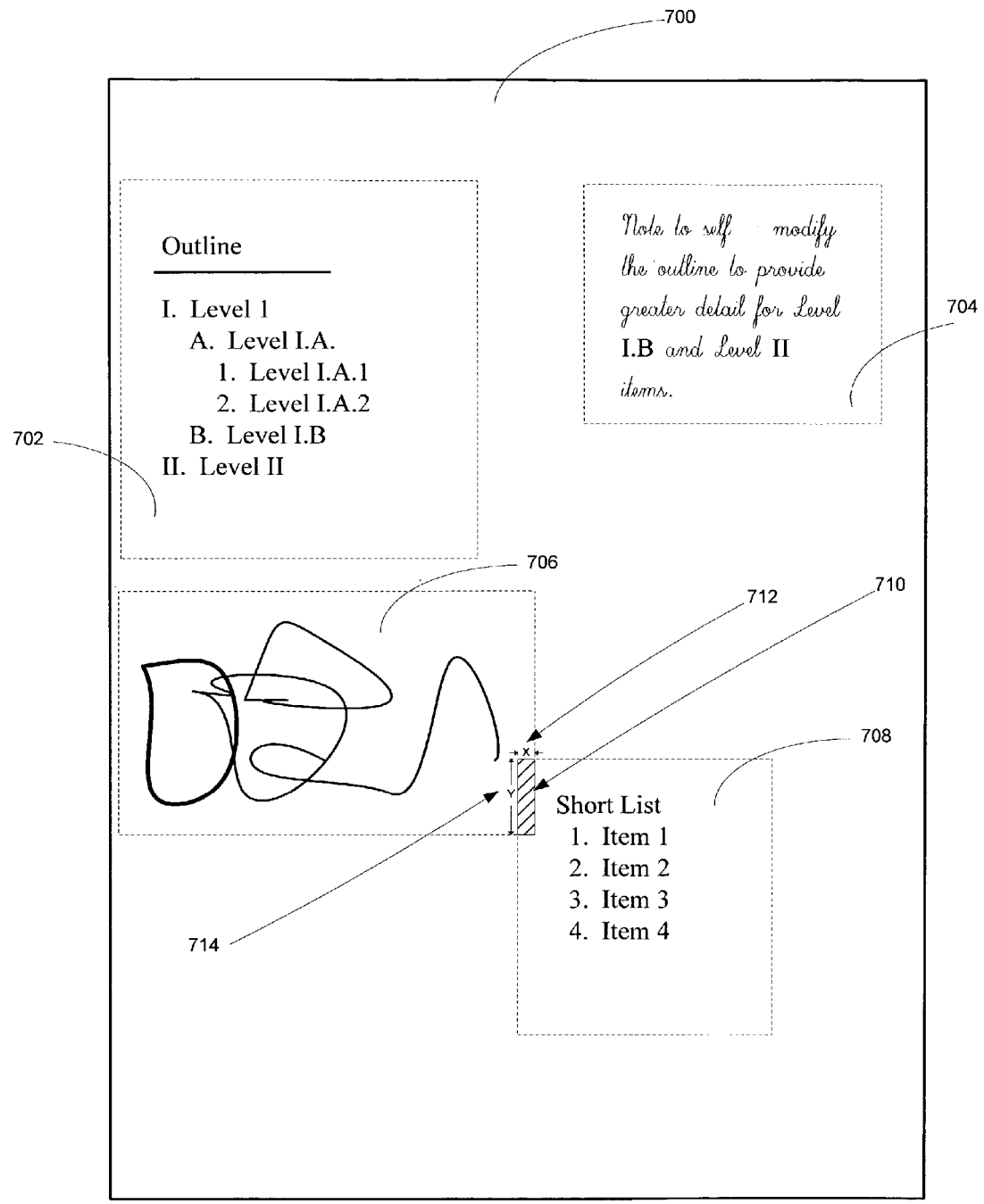
FIG. 7 is a block diagram depicting an exemplary screen containing document objects and illustrating a different collision.

FIG. 7 presents an exemplary free-form electronic document screen 700 with an outline object 702, a handwriting object 704, a drawing object 706, and a text object 708. FIG. 7 depicts the free-form screen after a collision between drawing object 706 and text object 708. This collision could have occurred, for example, by increasing the size of the drawing object 706. Following a page modification, including resizing an object, the present invention makes a layout pass to identify any collisions. In the example in FIG. 7, the overlap region 710 represents the results of a collision. An exemplary embodiment of the present invention compares the width of the overlap region X 712 with the height of the overlap region Y 714. In the illustration in FIG. 7, X is less than Y, meaning that the shorter distance for resolving the collision is to the side, i.e., moving the text object 708 to the right moves the object the shortest distance while resolving the collision between the drawing object 706 and the test object 708. FIG. 7 depicts document objects with rectangular boundaries. One skilled in the art would appreciate that object boundaries may also be defined as co-extensive with the object contents and a collision rule could define a collision as when content of one object overlaps content of another object.

Figure 8:
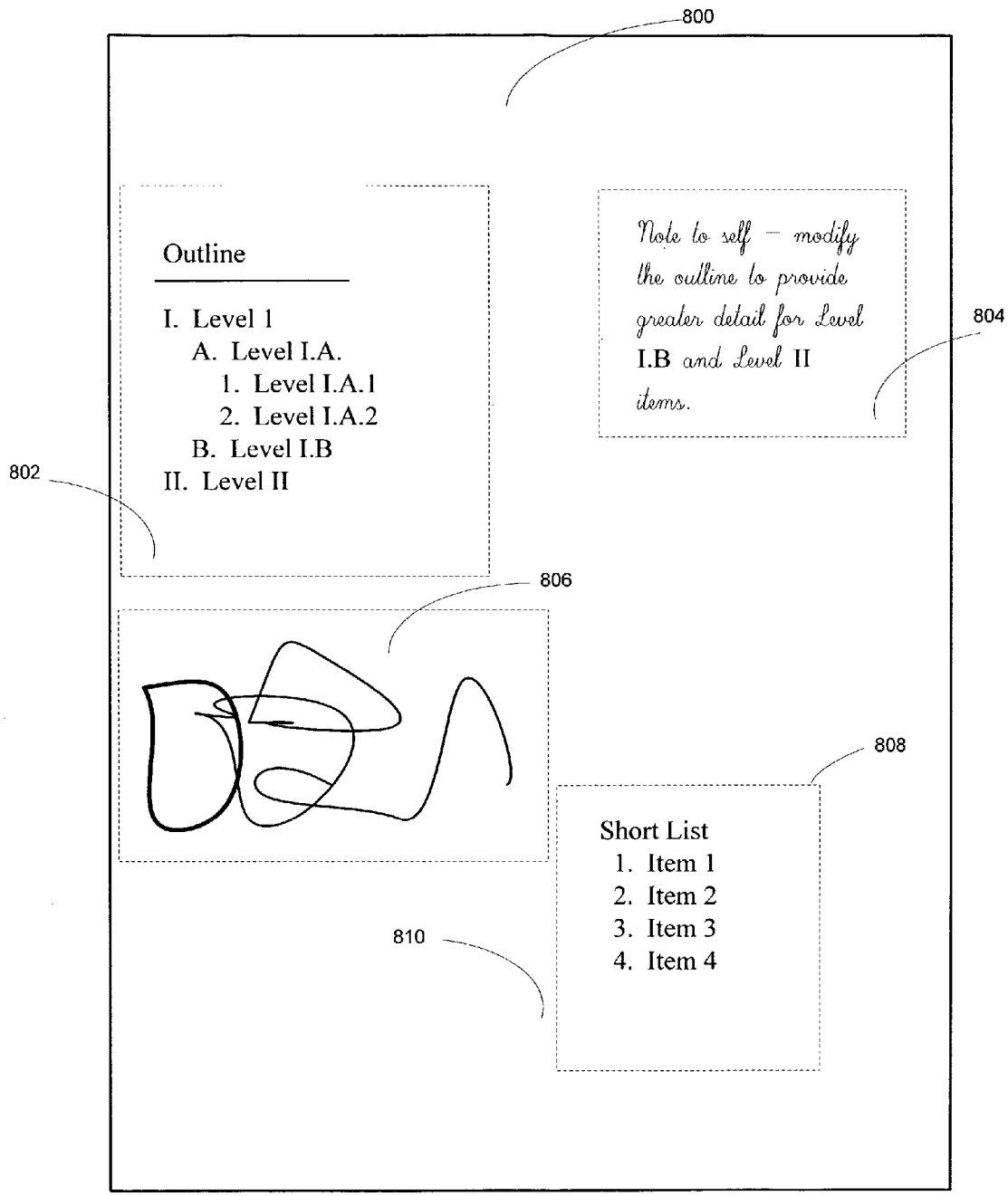
FIG. 8 is a block diagram depicting an exemplary screen containing document objects and illustrating resolving a collision by moving object to the side.

FIG. 8 depicts an exemplary free-form electronic screen 800 as it may look after the collision illustrated in FIG. 7 is resolved. The text object 808 is moved straight to the right from its pre-collision location on the page, depicted by the gray shaded box 810, to its new location, depicted by the dash-lined box 808. The outline object 802 and the handwriting object 804 may not be affected by the collision resolution. The exemplary resolution depicted in FIG. 8 shows the resulting location of text object 808 is fully within the electronic screen 800. In an exemplary embodiment of the present invention, if only a section of an object moved to the side following a collision resolution with a width less than one inch remains on the screen, then the object may not be moved to the side. Instead, the object may be moved straight down from its original location. One skilled in the art would appreciate that a variety of rules can be established for managing objects that move partly or completely outside the screen boundaries.

Figure 9:
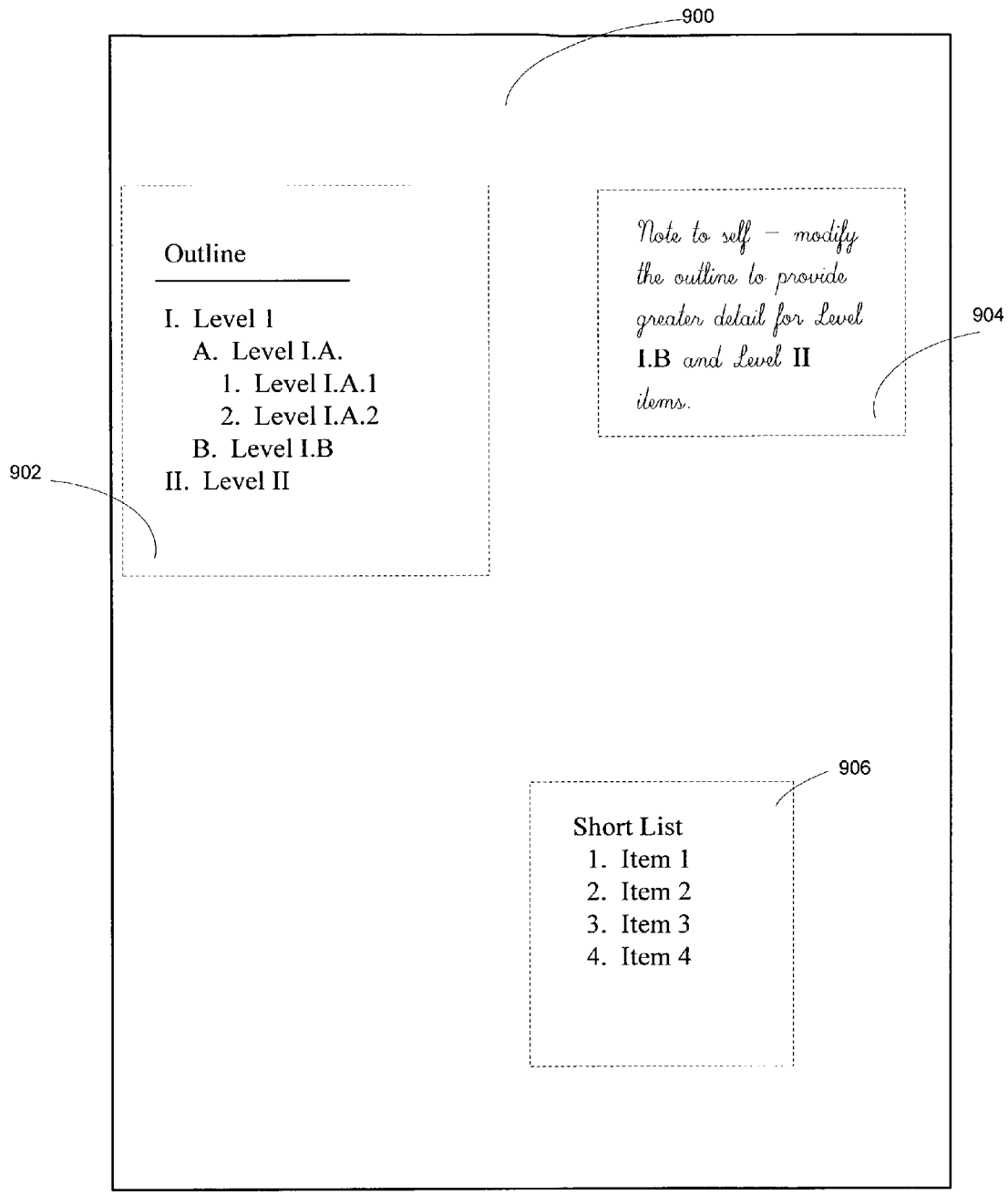
FIG. 9 is a block diagram depicting an exemplary screen containing document objects and illustrating an object moved as a result of resolving a collision returning to its original position.

An exemplary embodiment of the present invention may maintain information on objects' original positions. If a collision resolution operation moves an object, and later editing, moving, or resizing objects opens up the original position of the moved object, i.e., space on the document page originally occupied by the document object is free of any other document object, that object can be returned to its original location. FIG. 9 presents an exemplary free-form electronic document screen 900 illustrating the return of an object to its original position, using the collision resolution depicted in FIG. 8. FIG. 9 shows the screen layout after the drawing object 806 that caused the collision in FIG. 8 is moved or deleted. In this case, the text object 906 returns to its pre-collision location, illustrated by the gray shaded box in FIG. 9.

Figure 10:
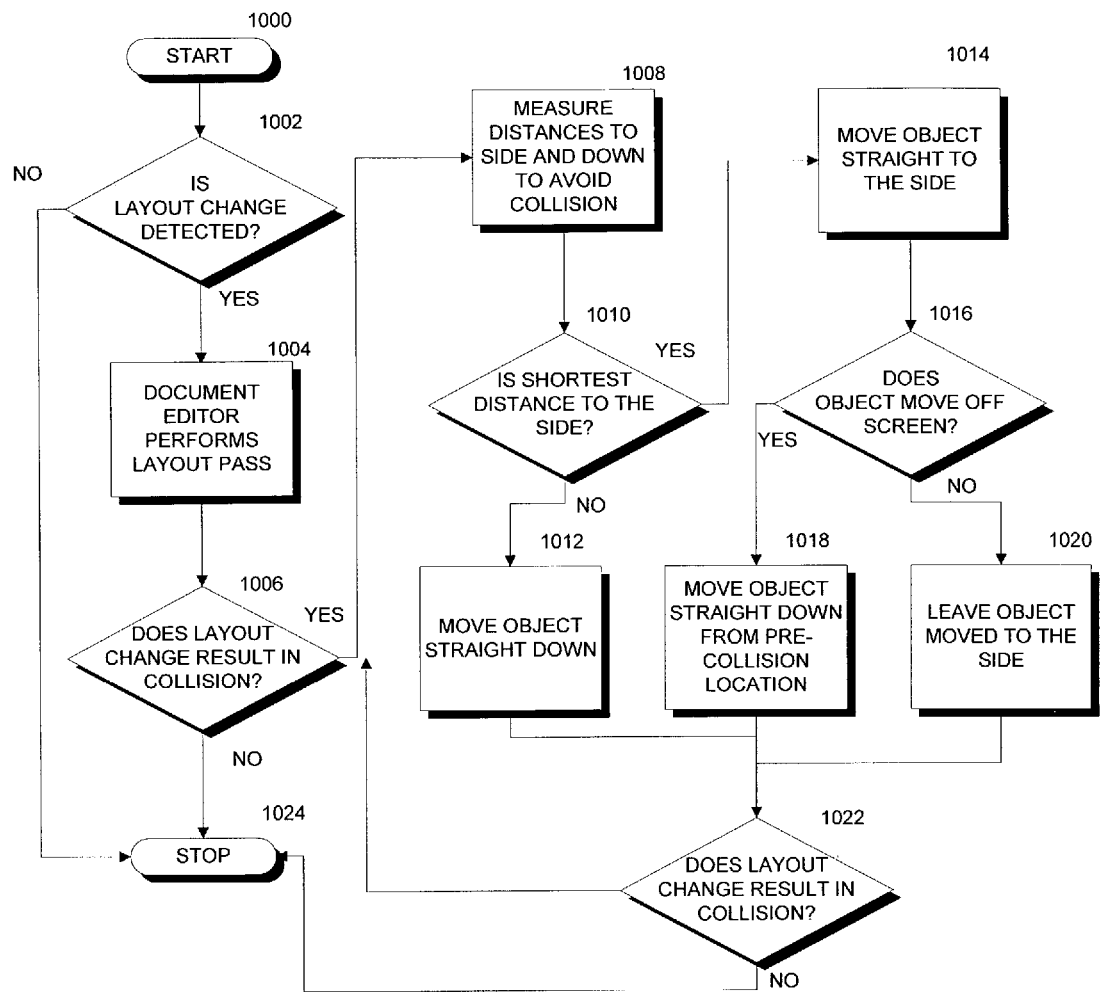
FIG. 10 is a flow chart illustrating the steps taken in one exemplary embodiment of the invention to identify and resolve collisions on an electronic document screen.

FIG. 10 is a flow chart depicting an exemplary method for resolving document object collisions. The method begins at start block 1000 and proceeds to decision block 1002, where the method determines if a layout change is detected, caused by resizing, editing or moving an existing object or adding a new document object. If a layout change is detected, then a layout pass is performed in step 1004 by the document editor. Otherwise, the method branches to end block 1024 and terminates. In decision block 1006, a determination is made as to whether any collision resulted from the layout change. If no collision occurred, the method branches to end block 1024 and terminates. If a collision did result from the layout change, the method moves to step 1008.

In step 1008, the original location of the object is recorded. Also in step 1008, the distance in the side-to-side direction of the page and the distance in the top-to-bottom direction of the page necessary to move the second object (the object hit as a result of the layout change) to resolve the collision is measured. If the decision step 1010 determines that the side-to-side distance is greater than or equal to the top-to-bottom distance, the object is moved straight down, step 1012. If not, the object is moved straight to the side, step 1014. At decision block 1016, this exemplary embodiment of the present invention determines if, by moving the object to the side, the object has been moved off the screen, e.g., a minimum of one inch in width of the object must be within the screen limits to be considered on the screen. If the resolution of the collision moves the object off the screen, the object is instead moved straight down from its pre-collision location, step 1018. If the object remains on the screen, the method moves to step 1020, and the object remains moved to the side. After the object has been moved as part of resolving a collision, the method, in step 1022 determines if any other collisions exist, including secondary collisions resulting from moving the object to resolve an initial collision. If additional collisions exist, the process repeats, beginning at step 1008. Otherwise, the method branches to end block 1024 and terminates. In one embodiment, the invention would return a moved object to its original location if the page is subsequently modified and the modification allows the object to return to its original location without causing a new collision.

Figure 11:
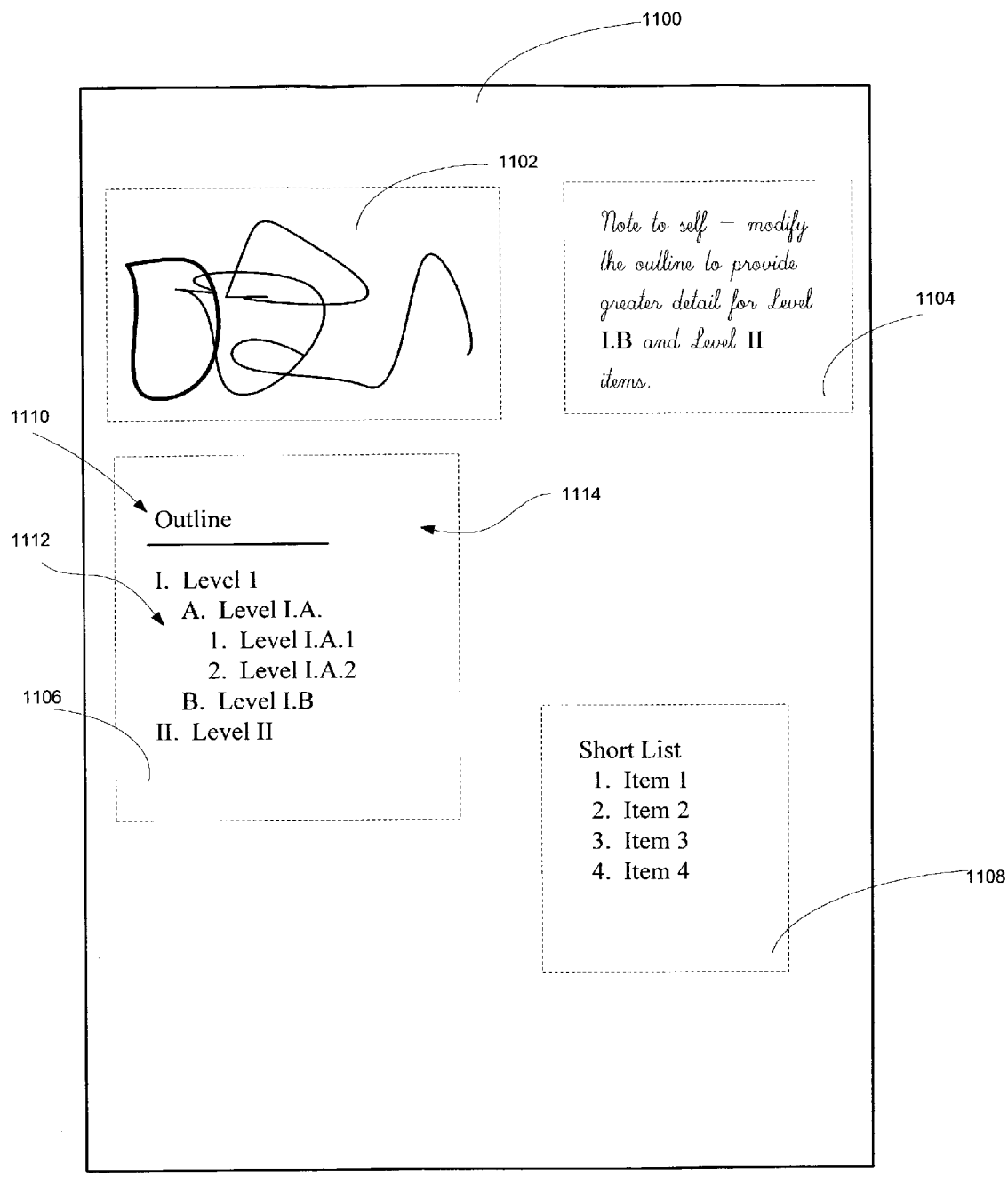
FIG. 11 is a block diagram depicting a screen containing document objects for an alternative exemplary embodiment of the present invention.

In an alternative embodiment of the present invention, the moving an object to resolve a collision may not be desired. This alternative embodiment can best be described by reference to figures. FIG. 11 depicts an exemplary free-form electronic document screen 1100 with four objects, a drawing object 1102, a handwriting object 1104, an outline object 1106, and a text object 1108. These objects can be edited, resized, moved, deleted, or a new object can be added to the page. In this alternative embodiment of the present invention, document objects that are moved on top of outline objects, added to an outline object's void space, or objects manually designated as "not able to collide" are not moved when a collision occurs. In these three cases, the alternative embodiment of the present invention encodes these objects with a designation that the method recognizes as meaning not to move the object if a collision needs to be resolved. One skilled in the art will appreciate that a variety of collision rules can be established for determining whether to move an object following a collision, i.e., designating a document object as "not able to collide." An outline object 1106 is characterized by a title 1110, multi-level text structure 1112, and void space 1114.

Figure 12:
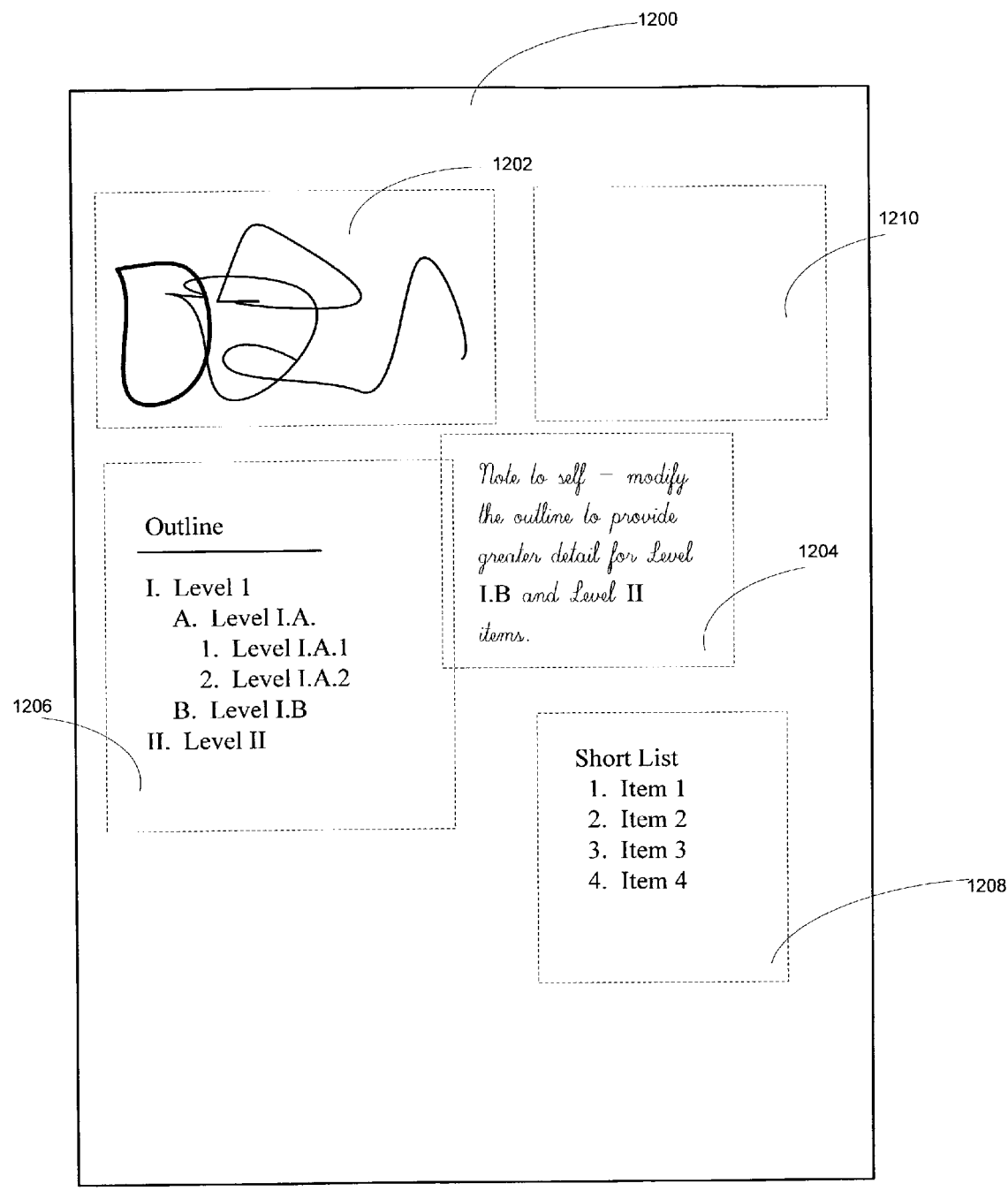
FIG. 12 is a block diagram depicting an exemplary screen containing document objects and illustrating moving an object on top of an outline object.

FIG. 12 depicts the same free-form electronic document screen as depicted in FIG. 11. However, the handwriting object is moved 1204 over on top of the outline object 1206. The handwriting object's original location is represented by the gray shaded area 1210. Once the handwriting object 1204 is moved on top of the outline object 1206, the characteristic of the handwriting object 1204 becomes designated by the alternative embodiment of the present invention as "not able to collide." If an object is edited, resized, moved, or added and it overlaps the handwriting object 1204, the collision will not be resolved.

Figure 13:
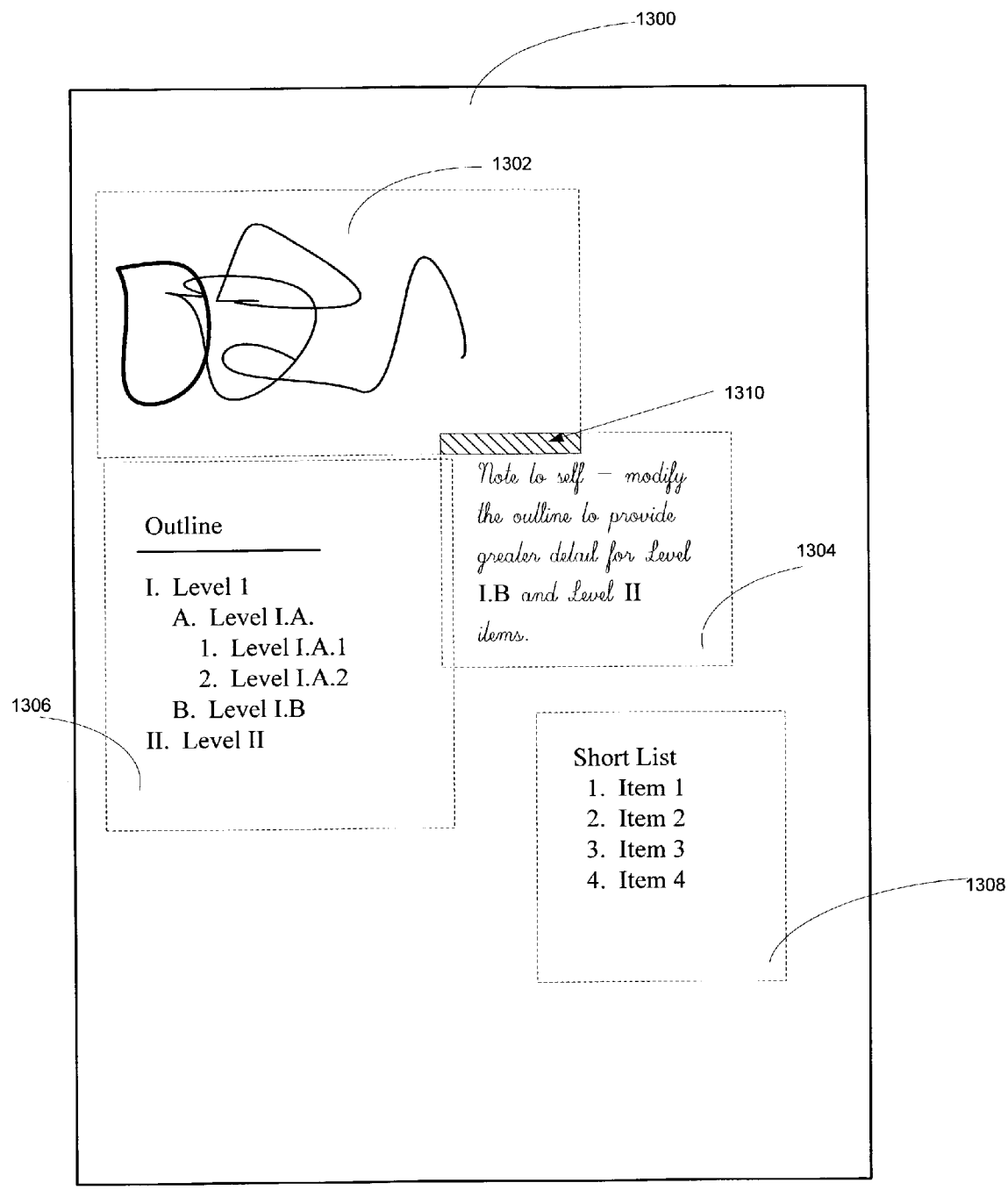
FIG. 13 is a block diagram depicting an exemplary screen containing document objects and illustrating a collision with an object characterized as "not able to collide."

FIG. 13 illustrates a collision that this alternative embodiment of the present invention may not resolve. During document editing, the drawing object 1302 is resized and overlaps the handwriting object 1304, but not the outline object 1306. The overlap region is depicted in the cross-hatched area 1310. Since the handwriting object 1304 had been moved over the outline object 1306 and became designated as "not able to collide," the alternative embodiment of the present invention will not move the object. However, if the resizing caused the drawing object 1302 to overlap with the outline object 1306, then the collision would be resolved and the outline object 1306 and handwriting object 1304 would move as one object.

Figure 14:
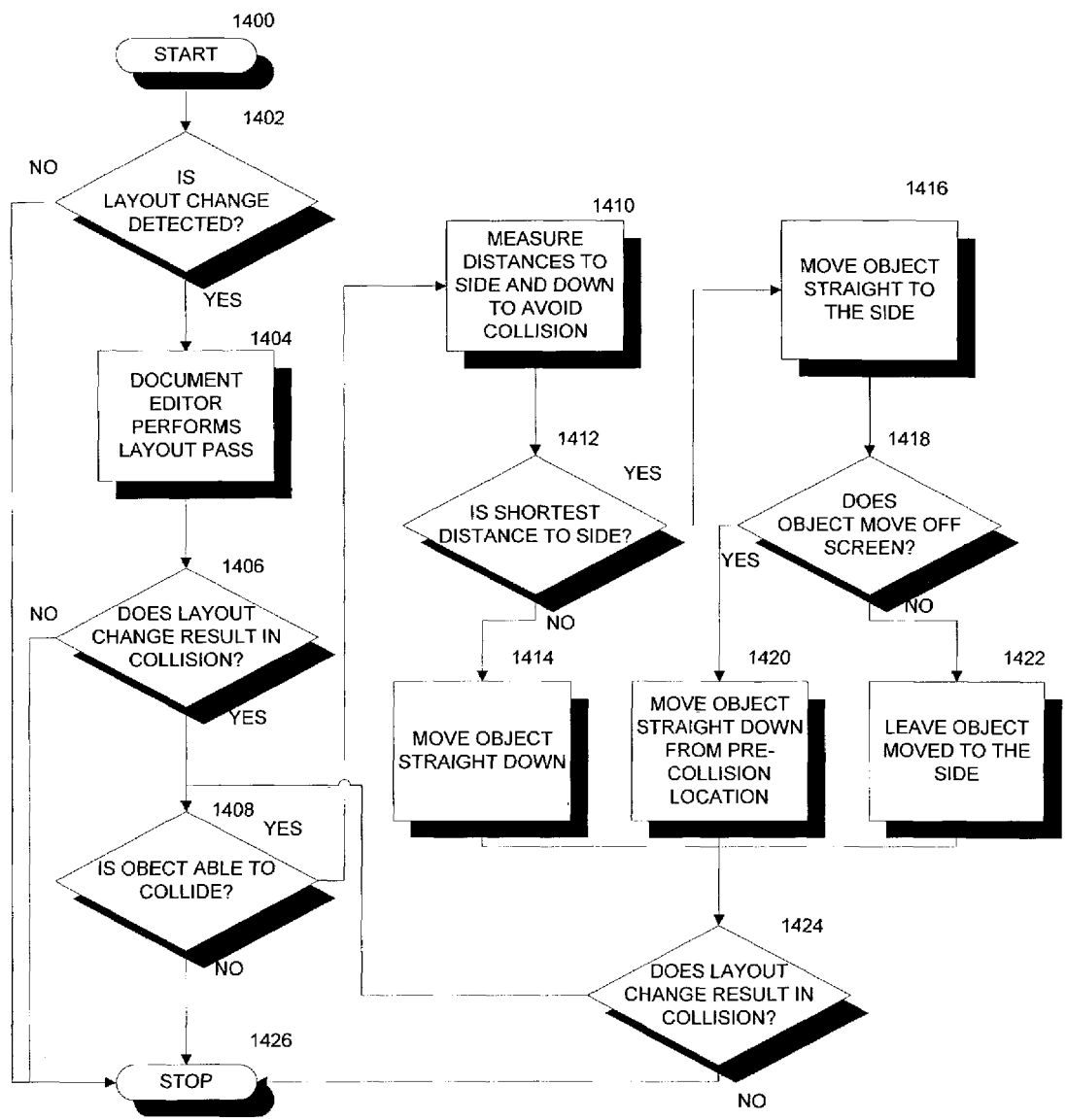
FIG. 14 is a flow chart illustrating the steps taken to identify and resolve collisions on an electronic document screen using an alternative exemplary embodiment of the present invention.

FIG. 14 is a flow chart depicting an exemplary method for resolving document object collisions. The method begins at start block 1400 and proceeds to decision block 1402, where the method determines if a layout change is detected, caused by resizing, editing or moving an existing object or adding a new document object. If a layout change is detected, then a layout pass is performed in step 1404 by the document editor. Otherwise, the method branches to end block 1426 and terminates. In decision block 1406, a determination is made as to whether any collision resulted from the layout change. If no collision occurred, the method branches to end block 1426 and terminates. If a collision did result from the layout change, the method moves to decision block 1408. At decision block 1408, the method determines whether the document object has been designated as not able to collide. If the object has been designated as not able to collide, the method branches to end block 1426 and terminates. Otherwise, the method branches to step 1410.

In step 1410, the original location of the object is recorded. Also in step 1410, the distance in the side-to-side direction of the page and the distance in the top-to-bottom direction of the page necessary to move the second object (the object hit as a result of the layout change) to resolve the collision is measured. If the decision step 1412 determines that the side-to-side distance is greater than or equal to the top-to-bottom distance, the object is moved straight down, step 1414. If not, the object is moved straight to the side, step 1416. At decision block 1418, this alternative embodiment of the present invention determines if, by moving the object to the side, the object has been moved off the screen, e.g., a minimum of one inch in width of the object must be within the screen limits to be considered on the screen. If the resolution of the collision moves the object off the screen, the object is instead moved straight down from its pre-collision location, step 1420. If the object remains on the screen, the method moves to step 1422, and the object remains moved to the side. After the object has been moved as part of resolving a collision, the method, in step 1424 determines if any other collisions exist, including secondary collisions resulting from moving the object to resolve an initial collision. If additional collisions exist, the process repeats, beginning at step 1408. Otherwise, the method branches to end block 1426 and terminates. In one embodiment, the invention would return a moved object to its original location if the page is subsequently modified and the modification allows the object to return to its original location without causing a new collision.

What is claimed is:

1. A computer-implemented method for resolving collisions between document objects on an electronic document page, the method comprising:

identifying the occurrence of a collision of a first document object and a second document object;

identifying, in response to the identified collision occurrence, a collision region comprising an overlapping area between the first document object and the second document object, the collision region having a first distance comprising a maximum length of the collision region in a side-to-side direction relative to the electronic document page and the collision region having a second distance comprising a maximum length of the collision region in a top-to-bottom direction relative to the electronic document page;

determining the shortest distance to move the second document object to resolve the collision wherein determining the shortest distance comprises;

determining the value of the first distance between the first document object and the second document object in the side-to-side direction relative to the electronic document page, determining the value of the second distance between the first document object and the second document object in the top-to-bottom direction relative to the electronic document page, setting a direction of the shortest distance to side-to-side if the first distance is less than the second distance, and setting the direction of the shortest distance to top-to-bottom if the first distance is greater than or equal to the second distance;

moving the second document object in the direction of the shortest distance;

recording the original location of the document object to be moved; and returning the document object to its original location if the document layout is further modified to allow the document object to return to its original location without resulting in a collision.

2. The method of claim 1, wherein identifying the occurrence of a collision of a first document object and a second document object is initiated by a page modification.

3. The method of claim 1, wherein identifying the occurrence of a collision of a first document object and a second document object is based on space occupied by the rectangular boundaries of at least one of the first document object or the second document object.

4. The method of claim 1, wherein identifying the occurrence of a collision of a first document object and a second document object is based on the space occupied by the content of at least one of the first document object or the second document object.

5. The method of claim 1, wherein identifying the occurrence of a collision of a first document object and a second document object is based on the document objects overlapping.

6. The method of claim 1, wherein identifying the occurrence of a collision of a first document object and a second document object is based on the document objects coming within a set distance of each other.

7. The method of claim 1, wherein moving the second document object comprises moving the second document object in a direction comprising one of the following: straight down and straight to one side.

8. The method of claim 1, further comprising:
recording the original location of the document object to be moved;
determining if a document object moved to the side to resolve a collision has been moved off the page; and
moving a document object that was moved to the side to resolve a collision and as a result has been moved off the page straight down from its original location.

9. The method of claim 1, further comprising repeating the stages in claim 1 until all collisions are resolved.

10. The method of claim 9, wherein identifying the occurrence of a collision of a first document object and a second document object is initiated by a page modification.

11. The method of claim 9, wherein identifying the occurrence of a collision of a first document object and a second document object is based on space occupied by the rectangular boundaries of at least one of the first document object or the second document object.

12. The method of claim 9, wherein identifying the occurrence of a collision of a first document object and a second document object is based on the space occupied by the content of at least one of the first document object or the second document object.

13. The method of claim 9, wherein identifying the occurrence of a collision of a first document object and a second document object is based on the document objects overlapping.

14. The method of claim 9, wherein identifying the occurrence of a collision of a first document object and a second document object is based on the document objects coming within a set distance of each other.

15. The method of claim 9, wherein moving the second document object comprises moving the second document object in a direction comprising one of the following: straight down and straight to one side.

16. The method of claim 9, further comprising:
recording the original location of the document object to be moved;
determining if a document object moved to the side to resolve a collision has been moved off the page; and
moving a document object that was moved to the side to resolve a collision and as a result has been moved off the page straight down from its original location.

17. The method of claim 1, further comprising:
determining if a document object is not able to move to resolve a collision; and
skipping process steps related to resolving a collision for document objects not able to be moved to resolve a collision.

18. A system for resolving collisions between document objects on an electronic document page, the system comprising:
a memory storage; and
a processing unit coupled to the memory storage, wherein the processing unit is operative to:
identify the occurrence of a collision of a first document object and a second document object;
determine that the second document object has not been designated as not able to collide;
determine, in response to determining that the second document object has been designated as able to collide, the shortest distance to move the second document object to resolve the collision wherein the processing unit being operative to determine the shortest distance comprises the processing unit being operative to;
determine a first distance between the first document object and the second document object in a side-to-side direction relative to the electronic document page,
determine a second distance between the first document object and the second document object in a top-to-bottom direction relative to the electronic document page,
set a direction of the shortest distance to side-to-side if the first distance is less than the second distance, and
set the direction of the shortest distance to top-to-bottom if the first distance is greater than or equal to the second distance;
move, in response to determining that the second document object has been designated as able to collide, the second document object in the direction of the shortest distance;
record the original location of the document object to be moved; and
return the document object to its original location if the document layout is further modified to allow the document object to return to its original location without resulting in a collision.

19. The method of claim 18, wherein the processing unit is further operative to determine that the second document object has not been designated as not able to collide based upon a determination that no user input has been received designating that the second document object is not to be moved when a collision occurs.

20. A computer-readable medium which stores a set of instructions which when executed performs a method for resolving collisions between document objects on an electronic document page, the method executed by the set of instructions comprising:

identifying the occurrence of a collision of a first document object and a second document object;

determining that the second document object has been designated as able to collide;

identifying, in response to the identified collision occurrence and in response to determining that the second document object has been designated as able to collide, a collision region comprising an overlapping area between the first document object and the second document object, the collision region having a first distance comprising a maximum length of the collision region in a side-to-side direction relative to the electronic document page and the collision region having a second distance comprising a maximum length of the collision region in a top-to-bottom direction relative to the electronic document page;

determining, in response to determining that the second document object has been designated as able to collide, the shortest distance to move the second document object to resolve the collision wherein determining the shortest distance comprises;

determining the value of the a first distance between the first document object and the second document object in the side-to-side direction relative to the electronic document page, determining the value of the a second distance between the first document object and the second document object in the top-to-bottom direction relative to the electronic document page, setting a direction of the shortest distance to side-to-side if the first distance is less than the second distance, and setting the direction of the shortest distance to top-to-bottom if the first distance is greater than or equal to the second distance;

moving, in response to determining that the second document object has been designated as able to collide, the second document object in the direction of the shortest distance;

recording the original location of the document object to be moved; and returning the document object to its original location if the document layout is further modified to allow the document object to return to its original location without resulting in a collision.

* * * * *